Aug. 3, 1965    M. M. SEELOFF ETAL    3,198,081
APPARATUS FOR TRIMMING FLASH FROM STRIP
Filed March 19, 1963    2 Sheets-Sheet 2

INVENTORS
MELVIN M. SEELOFF
JOSEPH H. COOPER

BY *Francis J. Klempay*
ATTORNEY

United States Patent Office 3,198,081
Patented Aug. 3, 1965

3,198,081
APPARATUS FOR TRIMMING FLASH
FROM STRIP
Melvin M. Seeloff and Joseph H. Cooper, Warren, Ohio,
assignors to The Taylor-Winfield Corporation, Warren,
Ohio, a corporation of Ohio
Filed Mar. 19, 1963, Ser. No. 266,271
4 Claims. (Cl. 90—24)

This invention relates generally to the art of joining metal strip, and more particularly to an improved method and apparatus for removing flash or upset which has been thrown up out of the principal surfaces of metal strip in the flash-butt welding thereof. It has heretofore been common practice to employ a flash trimmer in a strip feeding line beyond an electric resistance flash-butt strip welder for the purpose of removing the excess flash or upset metal which is forced out of the plane of the strip by the welding process. Probably the most satisfactory of such trimming devices is the kind wherein the strip is rigidly clamped on opposite sides of the joint and multiple precision guided cutting tools are drawn across the top and bottom surfaces of the strip in alignment with the line of weld to scarf off the excess flash or upset metal and thus to restore the surfaces of the joined strip back to their original planes and to reduce the thickness of the joint substantially down to the thickness of the parent strip. Such draw-cut trimmers are well known in the art.

When butt-welding soft metals, and particularly aluminum, a large amount of flash is automatically thrown up in the welding process and, further, the plastic nature of these metals causes substantial curling and balling of the scarfed-off metal ahead of the cutting tools of the draw-cut trimmer which tends to clog this mechanism and to damage the strip. This is true even though a plurality of cutting tools is used on each face of the strip comparable, for example, to the cutting action of a broach.

The primary object of the present invention is to provide an arrangement whereby a substantial portion of the flash or excess upset is automatically removed from the strip as the strip progresses from the welding station to the draw-cut trimming station so that the latter can cope with the soft flash and upset and operate in its intended manner to trim down the line of weld to smooth and uniform surfaces lying in planes substantially coincident with the top and bottom surfaces of the parent strip. This is accomplished, in accordance with out invention, by providing a plow-type of trimming mechanism which has top and bottom knives between which the strip or weld line is drawn in moving from the welding station to the draw-cut trimming station to remove a substantial part but not all of the flash and excess upset. Means is provided to automatically control the spacing of the knives in relation to the thickness of the parent strip, and the knives themselves are formed with fairly steep rake angles, whereby the over-all effect is to permit the line of weld to be drawn through the knives with the application of reasonably low pulling forces on the strip. Elongation of the strip is avoided and no damage results to the line of weld.

A further and more specific object of the invention is the provision in apparatus of the kind outlined above of an arrangement whereby the side thrusts imparted to the moving strip by the rake angles on the trimming knives are equalized in opposite directions so that no additional means is required to be added to the complete assembly to side guide the strip.

By utilizing the above mentioned auxiliary plow-type of trimmer between the welding station and the final trimming station we are able to effect completely satisfactory trimming of the weld line even in such soft plastic metals as aluminum with the use of very little additional apparatus and without adding any additional time to the over-all cycle of operation of the apparatus. While the final trimming station may be a draw-cut type of apparatus the invention is not so limited since any cross-cut type of trimmer may be used, including possibly rotating milling cutters. The auxiliary trimming knives may be located on the welder, in a separate housing or stand, or be included in the draw-cut trimming machine as we have herein chosen for illustration purposes.

The above and other objects and advantages of the invention will become apparent upon consideration of the following specification and the accompanying drawing wherein there is disclosed the above mentioned embodiment of the invention.

Figure 1:
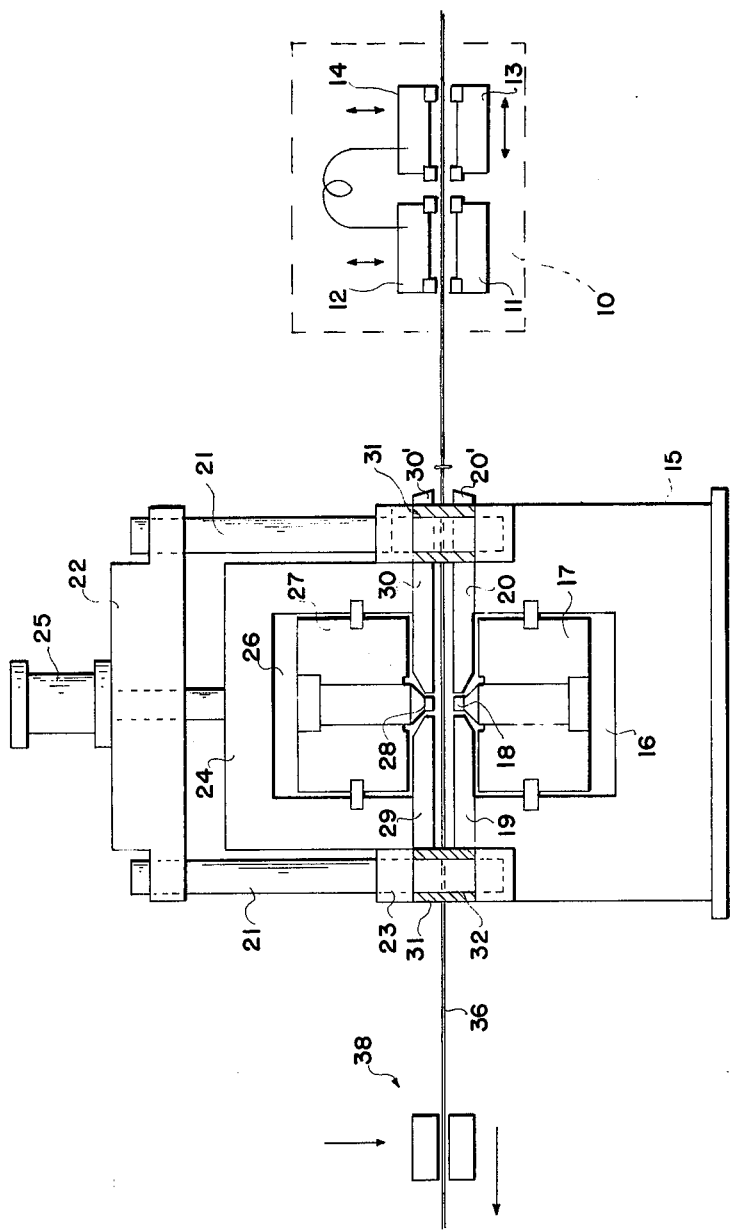
FIGURE 1 is a side elevation, partly in section, of a combined draw-cut and plow-type of flash trimmer for strip constructed in accordance with the principles of our invention, the view showing the relation of this apparatus to the flash-butt welder and means to advance the strip longitudinally whereby the line of weld may be moved from the welding station to the final trimming station.
Figure 2:
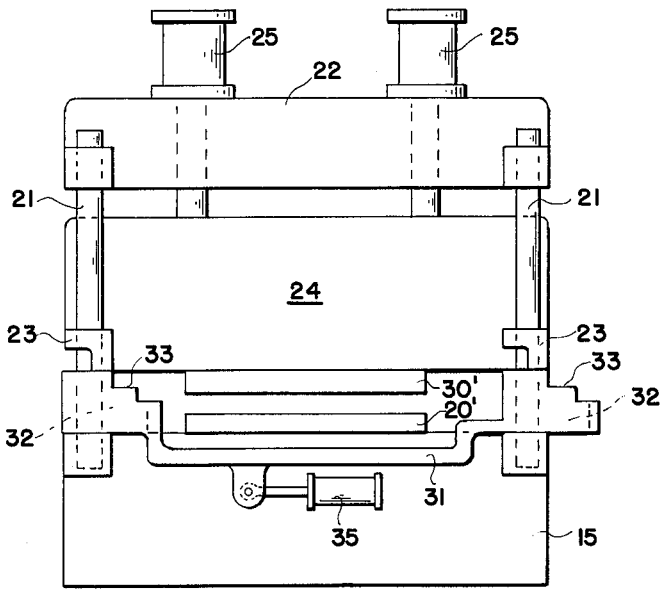
FIGURE 2 is a fragmentary end elevation of a portion of the apparatus of FIGURE 1.

In FIGURE 1, the reference numeral 10 designates generally a schematic showing of a flash-butt welder for metal strip having one pair of clamping electrodes 11 and 12 which are normally fixed longitudinally and a second pair of clamping electrodes 13 and 14 which, in accordance with usual practice, are carried by a longitudinally movable slide to effect the burn-off and upset in the welding cycle.

The flash trimming assembly illustrated comprises a base 15 having an opening 16 therethrough which extends transversely of the path of travel of the strip, and suitably guided in this opening 16 is a slide 17 which adjustably mounts a number of cutting tools, one of which is shown at 18. Also mounted on the base 15 are strip clamp pads 19 and 20 which are positioned on opposite sides of the transverse path of travel of the cutting tools 18. Extending upwardly from the base 15 and suitably anchored therein are four vertically disposed guide rods 21 interconnected by and mounting at their upper ends a header 22. Guided on the rods 21 by means of the bored lugs 23 is a vertically movable housing 24 arranged to be raised and lowered by cylinders 25 mounted on the header 22.

Extending through the housing 24 parallel with the opening 16 in the base 15 is an opening 26 in which is accurately guided a second slide 27 adjustably mounting a plurality of trimming or cutting tools one of which is shown at 28. Also carried by the housing 24 is a strip clamp pad 29 spaced vertically above the pad 19 and a second clamp pad 30 which is spaced vertically above the lower clamp pad 20.

In accordance with known construction, the slides 17 and 27 are interconnected at one end by structure, not shown herein which structure is in turn connected to some motive means which is operative to forcibly move the slides to effect a trimming operation and upon completion thereof to move the slides back to their initial starting positions preparatory to the next cycle of operation. Also in accordance with known practice, the tools 18 and 28 are so ground and adjusted that their cutting edges lie substantially in the planes of their adjacent clamp pads. Thus, assuming that a line of weld is stopped in alignment with the tools 18 and 28 and the housing 24 is moved downwardly under the pressure of the cylinders 25 whereby the strip is tightly clamped between platens 19 and 29 and between platens 20 and 30 subsequent actuation of the slides 17 and 27 will cause the tools 18 and 28 to move along the weld line to remove all flash and metal beyond the thickness of the strip.

In accordance with the principles of the present invention, the forward edges 30' and 20' of the two clamp platens 30 and 20, respectively, are made in the form of shearing knives whereby as the weld line is drawn between these platens a substantial part of the weld flash or excess upset will be removed, all as explained above. To control the amount of metal removed and also to insure that the clamps are held open sufficiently to permit the free movement of the strip between the platens thereof we provide means, now to be described, to variably limit the downward movement of the housing 24. Such means may comprise a member 31 for each end of the machine, each of the members 31 having a pair of horizontally extending slots 32 for receiving the guide rods 21. The vertical thickness of the member 31 about each of the slots 32 is stepped, as shown at 33, so that the limit of vertical descent of the housing 24 is determined by the horizontal position of the member 31. It should be observed that the bored lugs 23 on the housing 24 engage the top surfaces of the member 31 about the slots 32. Suitable means, such as the cylinder 35, may be employed to shift the member 31 in a horizontal direction, and suitable stop or locating means, not shown, will be provided to automatically locate the desired position for the member 31. Also, the two members 31, to the right and left as viewed in FIGURE 1, will be suitably mechanically interconnected so that they move in unison. It should be understood that the extent of the steps 33 is exaggerated in the drawing since normally the only variation would be to compensate for strip in different gauge ranges.

Figure 3:
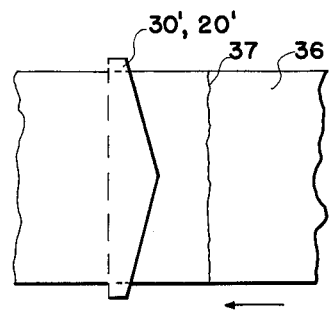
FIGURES 3 and 4 are schematic showings of alternate arrangements for the shearing knives of the plow-type trimmer for balancing the side thrusts on the strip as the latter is drawn through the knives.
Figure 4:
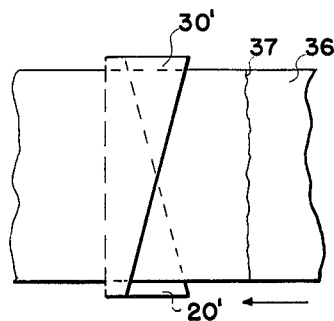

The cutting edges of the knife sections 30' and 20' of the platens 30 and 20, respectively, are heavily raked as indicated in plan in FIGURES 3 and 4 so as to minimize the pulling force required to draw the strip past these knives. In FIGURES 3 and 4 reference numeral 36 designates the strip while reference numeral 37 designates the line of weld therein. In FIGURE 3 the plan of the knife edges 30', 20' is V-shaped with the point of the V substantially in the center of the strip, and it should be understood that as the weld line 37 engages and moves between the knives the equally angled side sections of the knives will hold the strip on its center line and thus avoid any tendency of the strip to veer to one or the other side of its path of travel. In the embodiment of the invention shown in FIGURE 4 the upper knife blade 30' is raked in one direction while the bottom knife blade 20' is raked in an equal but opposite direction. Again, the over-all effect is to keep the strip moving along its intended path since any tendency of the knife 30' to veer the strip to the left is equally opposed by the tendency of the rake on blade 20' to move the strip to the right.

Since, as stated above, the deeply angled rake formed on the blades 30' and 20' minimizes the force required to draw the weld line between the blades we may provide a conventional pinch-roll pass, not shown, to move the strip longitudinally whereby the weld is advanced from the welder through the blades 30', 20', and thence into alignment between the tools 18 and 28. Alternatively, we may provide a power-operated sliding clamp 38 to perform this function, the equivalency of these devices for the purpose indicated being well appreciated in the art.

It should now be apparent that we have provided an improved method for removing heavy flash from flash-butt welded strip of soft plastic metal which accomplishes the objects initially set out. Of particular importance is the fact that the shear knives (30', 20') remove the flash in strip form rather than in conventional curled chip or ball form which, when an appreciable volume of metal is present, may build up to such pressures that the strip is scored or otherwise damaged. A sufficient percentage of the flash or excess upset is removed in this easy and harmless manner so that the remaining excess material may be easily and cleanly handled by the final trimmer, without any damage whatever done to the joined strip. The final trimmer is necessary to properly finish the joint because this cannot be done by knives 30', 20' alone. When such knives are brought down hard on the strip a heavy pulling force is required which may elongate the strip and/or open up the weld seam. In the final trimmer the strip is rigidly clamped very close to the cutting tools and if the latter are kept sharp there is little stress imparted to the parent thickness of the strip.

Since as pointed out above various changes may be made in the arrangement of our apparatus without departing from the spirit or scope of the invention reference should be had to the appended claims in determining the scope of the invention.

We claim:

1. Apparatus for finishing metal strip having a butt-welded transverse joint therein and wherein flash and excess upset metal protrudes outwardly of the surfaces of the strip comprising a base and longitudinally spaced strip clamp platens on said base, a vertically moving housing and means carried by said base to guide the vertical movement of said housing, said housing mounting a pair of longitudinally spaced strip clamp platens overlying said first mentioned platens, separate tool slides mounted in said base and housing for sliding movement transversely of strip held by said platen and carrying cutting tools for machining the weld joint positioned between the clamps formed by said platens, means at one longitudinal end of said apparatus to draw strip through said apparatus whereby said weld joint is moved into alignment with said cutting tools, and the edges of said platens which are at the other longitudinal end of said apparatus being formed with shear knives whereby said protruded flash and excess weld metal is partially removed as said strip is drawn through said apparatus.

2. Apparatus for finishing metal strip having a butt-welded transverse joint therein and wherein flash and excess upset metal protrudes outwardly of the surfaces of the strip comprising a base and longitudinally spaced strip clamp platens on said base, trimming means carried by the base and movable between said platens in a direction transverse of strip lying on said platens to machine off any flash and excess upset metal protruding downwardly from the strip at the line of weld, a housing mounted on said base for vertical movement above said platens and mounting on its lower portion a pair of longitudinally spaced other strip clamp platens for coaction with the first mentioned platens, trimming means carried by said housing and movable between said other platens in a direction transverse of the strip to machine off any flash and excess upset metal protruding upwardly from the strip at the weld line, the pair of platens on one longitudinal side of said trimming means carrying at their longitudinal outer edges scarfing knives to partially remove the upwardly and downwardly protruding flash and excess upset metal upon partial opening of the strip clamps and as the strip is advanced longitudinally to move the weld line between the scarfing knives.

3. Apparatus according to claim 2 further including adjustable stop means to limit the downward movement of said housing whereby the vertical space between said scarfing knives may be varied.

4. Apparatus for use with a flash-butt welding machine having a welding station for joining metal strip in end-to-end relation comprising means adapted to be positioned beyond the welding machine to engage strip extending therefrom and to advance said strip longitudinally whereby a weld joint may be moved from said station to a predetermined location, means adapted to be positioned at said location to rigidly clamp the strip on opposite sides of said weld joint, means carried with said clamping means and movable transversely of the strip to machine off weld flash from the opposite surfaces of the welded strip along said joint, a pair of shear knives adapted to be positioned between said station and said location for engaging and at least partially removing weld flash from the opposite surfaces of the welded strip, and means adjustably mounting one of said shear knives for movement toward and away from the other whereby the extent of flash removed by said knives may be varied; said adjustable mounting means comprising a platen and means to move said platen toward and away from said other knife as well as adjustable stops for engaging said platen at spaced points.

References Cited by the Examiner

UNITED STATES PATENTS

| | | |
|---|---|---|
| 1,184,973 | 5/16 | Lloyd. |
| 1,832,719 | 11/31 | McBerty. |
| 1,958,146 | 5/34 | Kelley. |
| 1,958,147 | 5/34 | Kelley et al. |
| 2,015,955 | 10/35 | Morton |
| 2,169,824 | 8/39 | Tubbs. |
| 2,202,910 | 6/40 | Iversen. |
| 2,359,719 | 10/44 | Simpson _____ 90—24 |
| 2,592,640 | 4/52 | Bailis. |
| 2,852,985 | 9/58 | Schlatter et al. _____ 90—24 |
| 2,936,679 | 5/60 | Thuerwachter _____ 90—24 |
| 3,015,995 | 1/62 | Fahy _____ 90—24 |

WILLIAM W. DYER, Jr., *Primary Examiner.*